US010430286B2

(12) United States Patent
Okamoto

(10) Patent No.: US 10,430,286 B2
(45) Date of Patent: Oct. 1, 2019

(54) STORAGE CONTROL DEVICE AND STORAGE SYSTEM

(71) Applicant: FUJITSU LIMITED, Kawasaki-shi, Kanagawa (JP)

(72) Inventor: Hiroshi Okamoto, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 13 days.

(21) Appl. No.: 15/650,002

(22) Filed: Jul. 14, 2017

(65) Prior Publication Data
US 2018/0046553 A1 Feb. 15, 2018

(30) Foreign Application Priority Data

Aug. 15, 2016 (JP) ................. 2016-159119

(51) Int. Cl.
G06F 11/14 (2006.01)
G06F 16/16 (2019.01)
G06F 16/11 (2019.01)

(52) U.S. Cl.
CPC ........ *G06F 11/1456* (2013.01); *G06F 16/128* (2019.01); *G06F 16/164* (2019.01); *G06F 2201/84* (2013.01)

(58) Field of Classification Search
CPC ............... G06F 3/00; G06F 3/06–0689; G06F 11/00–3696; G06F 12/00–16;
(Continued)

(56) References Cited

U.S. PATENT DOCUMENTS 6,038,639 A * 3/2000 O'Brien .............. G06F 11/1435
711/114
6,594,744 B1 * 7/2003 Humlicek ............. G06F 3/0601
707/999.202
(Continued)

FOREIGN PATENT DOCUMENTS

JP 2005-284609 10/2005
JP 2009-163334 7/2009

OTHER PUBLICATIONS

Get Last Modified Date of File in Linux; Dawid Ferenczy; Mar. 15, 2016; retrieved from https://superuser.com/questions/737247/get-last-modified-date-of-file-in-linux on Oct. 19, 2018 (Year: 2016).*
(Continued)

*Primary Examiner* — Daniel C. Chappell
(74) *Attorney, Agent, or Firm* — Staas & Halsey LLP

(57) ABSTRACT

A storage control device includes a processor configured to create a first snapshot corresponding to a storage area by a copy-on-write method and management information used for managing a location of a data block updated after the creation, and copy all files included in the first snapshot to a first backup area. The processor is configured to create a second snapshot and identify, on basis of the management information, a second area in a first area of the second snapshot. The first area stores therein first metadata on all of second files included in the second snapshot. The second area is updated after the creation. The processor is configured to identify updated files updated after the creation among the second files, on basis of second metadata among the first metadata. The second metadata is included in the second area and copy the updated files to a second backup area.

10 Claims, 14 Drawing Sheets

(58) Field of Classification Search
CPC . G06F 13/00–4295; G06F 17/00–5095; G06F 2003/0691–0698; G06F 2009/3883; G06F 2009/45562–45595; G06F 2201/00–885; G06F 2206/00–20; G06F 2209/00–549; G06F 2211/00–902; G06F 2212/00–7211; G06F 2213/00–4004; G06F 2216/00–17; G06F 2221/00–2153
See application file for complete search history.

(56) References Cited

U.S. PATENT DOCUMENTS

| | | | | | |
|---|---|---|---|---|---|
| 6,694,413 | B1 * | 2/2004 | Mimatsu | | G06F 11/1466 707/999.202 |
| 6,799,189 | B2 * | 9/2004 | Huxoll | | G06F 11/1471 |
| 7,103,713 | B2 * | 9/2006 | Saika | | G06F 11/1456 711/112 |
| 7,136,977 | B2 * | 11/2006 | Obayashi | | G06F 11/1458 711/162 |
| 7,167,880 | B2 * | 1/2007 | Amano | | G06F 11/1435 |
| 7,743,031 | B1 * | 6/2010 | Cameron | | G06F 3/0611 707/649 |
| 8,904,126 | B2 * | 12/2014 | Ashutosh | | G06F 11/1451 711/161 |
| 9,146,877 | B2 * | 9/2015 | Ezra | | G06F 3/0614 |
| 9,164,896 | B2 * | 10/2015 | Yano | | G06F 11/1471 |
| 9,311,014 | B2 * | 4/2016 | Ezra | | G06F 3/0614 |
| 9,372,758 | B2 * | 6/2016 | Ashutosh | | G06F 11/1451 |
| 2004/0093474 | A1 * | 5/2004 | Lin | | G06F 16/1727 711/162 |
| 2005/0216535 | A1 | 9/2005 | Saika et al. | | |
| 2006/0047926 | A1 * | 3/2006 | Zheng | | G06F 3/0608 711/162 |
| 2009/0013138 | A1 * | 1/2009 | Sudhakar | | G06F 11/1435 711/162 |
| 2009/0313626 | A1 * | 12/2009 | Dawson | | G06Q 10/06 718/100 |
| 2017/0017413 | A1 * | 1/2017 | Aston | | G06F 3/0643 |

OTHER PUBLICATIONS

Anatomy of a Hardware RAID Controller; Kennedy, Patrick; Feb. 22, 2011; retrieved from https://www.servethehome.com/anatomy-hardware-raid-controller/ on Oct. 19, 2018 (Year: 2011).*

Realizing Multilevel Snapshots in Dynamically Changing Virtualized Storage Environments; Brinkmann et al.; Proceedings of the International Conference on Networking, International Conference on Systems and International Conference on Mobile Communications and Learning Technologies; Apr. 23-29, 2006 (Year: 2006).*

A Survey of Storage Remote Replication Software; Pandey et al.; 3rd International Conference on Eco-friendly Computing and Communication Systems; Dec. 18-21, 2014 (Year: 2014).*

Design and Analysis of Block-Level Snapshots for Data Protection and Recovery; Xiao et al.; IEEE Transactions on Computers, vol. 58, iss. 12, pp. 1615-1625; Dec. 2009 (Year: 2009).*

* cited by examiner

FIG.9

|  | LBA ON NAS VOLUME | BIT NUMBERS OF BIT MAP |
|---|---|---|
| SUPER BLOCK | 0x000 ~ 0x1FF | 0 ~ 15 |
| METADATA AREA | 0x200 ~ 0x961FF | 16 ~ 19215 |
| JOURNAL LOG AREA | 0x96200 ~ | 19216 ~ |

175

STORAGE CONTROL DEVICE AND STORAGE SYSTEM

CROSS-REFERENCE TO RELATED APPLICATION

This application is based upon and claims the benefit of priority of the prior Japanese Patent Application No. 2016-159119, filed on Aug. 15, 2016, the entire contents of which are incorporated herein by reference.

FIELD

The embodiments discussed herein are related to a storage control device and a storage system.

BACKGROUND

In the case where a storage area storing files is backed up a plurality of times at time intervals, the storage capacity of a backup destination becomes huge when all files in the storage area are backed up each time. Therefore, a differential backup is performed in which only files that are updated since the previous backup time is backed up, thereby saving the storage capacity of the backup destination.

The following backup system has been proposed for data backup. An information processing device included in the backup system records information indicating a backup time in file management information included in a file stored in a storage. The information processing device compares the file management information at a predetermined backup time to the file management information at another backup time, and acquires and records the difference information obtained through the comparison.

The following storage device has also been proposed. The storage device synthesizes data stored in an operation volume with difference data stored in a difference volume on the basis of mapping information for managing a relationship between data regarding the operation volume and data regarding the difference volume storing the difference data between a snapshot and the operation volume, and transmits the synthesized data to a backup device.

Related technologies are disclosed in, for example, Japanese Laid-Open Patent Publication No. 2009-163334 and Japanese Laid-Open Patent Publication No. 2005-284609.

SUMMARY

According to an aspect of the present invention, provided is a storage control device including a memory and a processor coupled to the memory. The processor is configured to create a first snapshot corresponding to a storage area of a storage device by a copy-on-write method. The processor is configured to create management information and store the management information in the memory. The management information is used for managing a location of a data block updated after the creation of the first snapshot. The data block is included in the storage area. The processor is configured to copy all of first files included in the first snapshot to a first backup area. The processor is configured to create a second snapshot corresponding to the storage area. The processor is configured to identify, on basis of the management information, a second area in a first area of the second snapshot. The first area stores therein first metadata on all of second files included in the second snapshot. The second area is updated after the creation of the first snapshot. The processor is configured to identify updated files updated after the creation of the first snapshot among the second files, on basis of second metadata among the first metadata. The second metadata is included in the second area. The processor is configured to copy the updated files to a second backup area.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

FIG. 9 is a diagram illustrating a specific example of data arrangement in the NAS volume;

DESCRIPTION OF EMBODIMENTS

In the differential backup in units of file, it is determined whether a file is updated since the previous backup time on the basis of metadata information corresponding to the file. In this determination, for example, an archive attribute or an update time included in the metadata is used. However, when a differential backup is performed in units of file on a certain storage area, it is required to refer to metadata corresponding to all files included in the storage area. Thus, a load of referencing metadata is large, and therefore, there is a problem in that the time taken for backup increases or the progress of other processes performed in parallel is affected.

Hereinafter, embodiments of the present disclosure will be described with reference to the accompanying drawings.

First Embodiment

Figure 1:
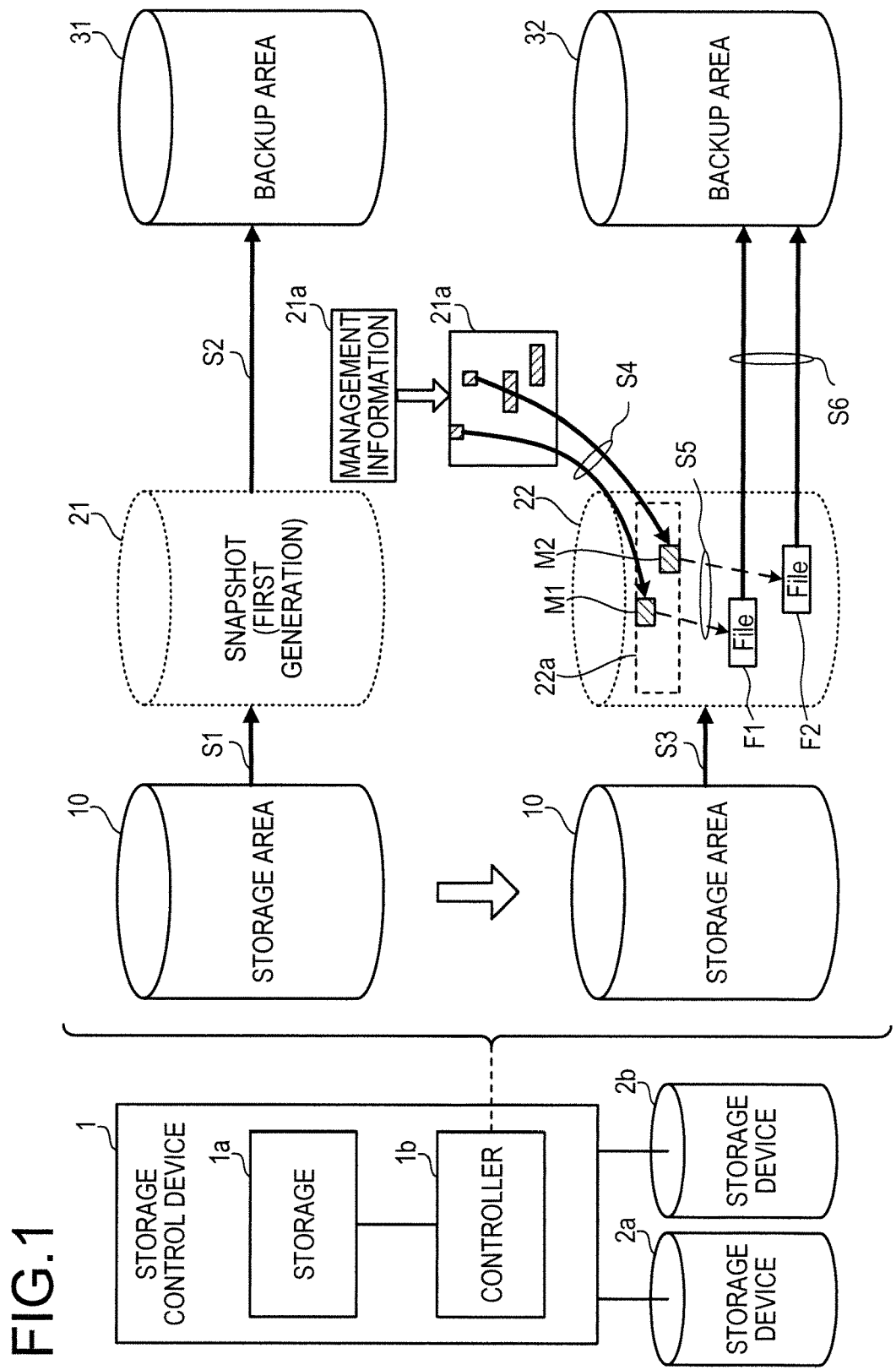
FIG. 1 is a diagram illustrating an exemplary configuration and an exemplary process performed by a storage control device according to a first embodiment.

FIG. 1 illustrates an exemplary configuration and an exemplary process of a storage control device according to a first embodiment. A storage control device 1 according to the first embodiment includes a storage 1a and a controller 1b. The storage 1a is implemented as, for example, a random access memory (RAM) or a hard disk drive (HDD). The controller 1b is implemented as, for example, a processor. In this case, the following process performed by the controller 1b is implemented when a processor executes a program.

For example, storages 2a and 2b are coupled to the storage control device 1. The storage 2a is, for example, an HDD, and the storage 2b is, for example, a tape drive that performs read/write on a magnetic tape.

The controller 1b creates a snapshot 21 corresponding to a storage area 10 by, for example, a copy-on-write method (S1). The storage area 10 is, for example, a logical storage area implemented by the storage 2a. In FIG. 1, it is assumed that the generation of the snapshot 21 is a first generation. The controller 1b also stores management information 21a used for managing the location of a data block updated after creation of the snapshot 21, among data blocks included in the storage area 10, in the storage 1a.

The controller 1b copies all files included in the snapshot 21 to a backup area 31 (S2). The backup area 31 is preferably implemented by a recording medium other than the storage area 10, for example, the backup area 31 may be implemented by the storage 2b.

Here, at the time point when the snapshot 21 is created, in actuality, actual data is not copied from the storage area 10 to the snapshot 21, but only information for managing the snapshot 21 is created. Meanwhile, the location of a data block updated in the storage area 10 after the creation of the snapshot 21 is recorded in the management information 21a.

For example, the management information 21a is implemented as a bit map including bits corresponding to respective blocks of the storage area 10. In the initial state, "0" is set for each bit. Then, when update of a certain block in the storage area 10 is requested after the creation of the snapshot 21, the controller 1b refers to a bit of the management information 21a, which corresponds to the block. When "0" is set for the bit, the controller 1b evacuates pre-update data, which is stored in the write destination block of the storage area 10, to the area of the snapshot 21 and sets "1" for the bit. Thereafter, the controller 1b writes new data in the write destination block of the storage area 10. Meanwhile, when "1" is set for the bit, the controller 1b writes new data in the write destination block of the storage area 10 without evacuating the pre-update data as described above. Through this processing, data in the storage area 10 at the time point when the snapshot 21 is created is reliably saved.

Thereafter, the controller 1b, at the next backup timing, creates a snapshot 22 corresponding to the storage area 10 (S3). In FIG. 1, it is assumed that the generation of the snapshot 22 is a second generation. The controller 1b executes the following processing in order to store only files updated after the creation of the previous generation snapshot 21, among files included in the snapshot 22, in a backup area 32.

The controller 1b identifies an area updated after the creation of the snapshot 21, in a metadata area 22a in which metadata on all files included in the snapshot 22 is written, based on the management information 21a (S4). In the present embodiment, it is assumed that, within the snapshot 22, an area where the metadata area 22a is present is determined in advance. Therefore, the controller 1b may recognize which one of locations of updated data blocks, which are managed by the management information 21a, is the location of the metadata area 22a.

When a file included in the storage area 10 is updated, the metadata related to the file is also updated. For example, as the metadata, information indicating the update date and time of the file is updated. In the example of FIG. 1, it is assumed that files F1 and F2 are updated after the snapshot 21 is created. In this case, not only the areas of the files F1 and F2, but also an area M1 including metadata on the file F1 and an area M2 including metadata on the file F2 in the metadata area 22a are also updated. The management information 21a holds information indicating the updates of not only the data blocks corresponding to the files F1 and F2, but also the data blocks corresponding to the areas M1, and M2. Thus, the controller 1b identifies the updated areas M1 and M2 in the metadata area 22a, based on the management information 21a.

The controller 1b identifies the updated files F1 and F2 on the basis of the metadata included in the areas M1 and M2 (S5). For example, the controller 1b recognizes that the files F1 and F2 are updated, based on information of the update date and time related to the files F1 and F2, which are included in the areas M1 and M2, respectively.

Then, the controller 1b copies only the updated files F1 and F2 among the files included in the snapshot 22, to the backup area 32 (S6). The backup area 32 is implemented by, for example, the storage 2b, or a recording medium other than the storages 2a and 2b.

In a related art, in order to identify updated files in a storage area, it is been necessary to refer to metadata related to all files in the storage area. According to the present embodiment, the controller 1b may identify the updated files F1 and F2 by referring to only updated areas M1 and M2 in the metadata area 22a, based on the management information 21a corresponding to the previous generation snapshot 21. As described above, the area referenced for identifying the updated files F1 and F2 is limited to a part of the metadata area 22a, so that the processing load of the differential backup may be reduced, and the processing time thereof may be shortened.

Second Embodiment

Subsequently, as a second embodiment, a storage system including a unified storage is described.

Figure 2:
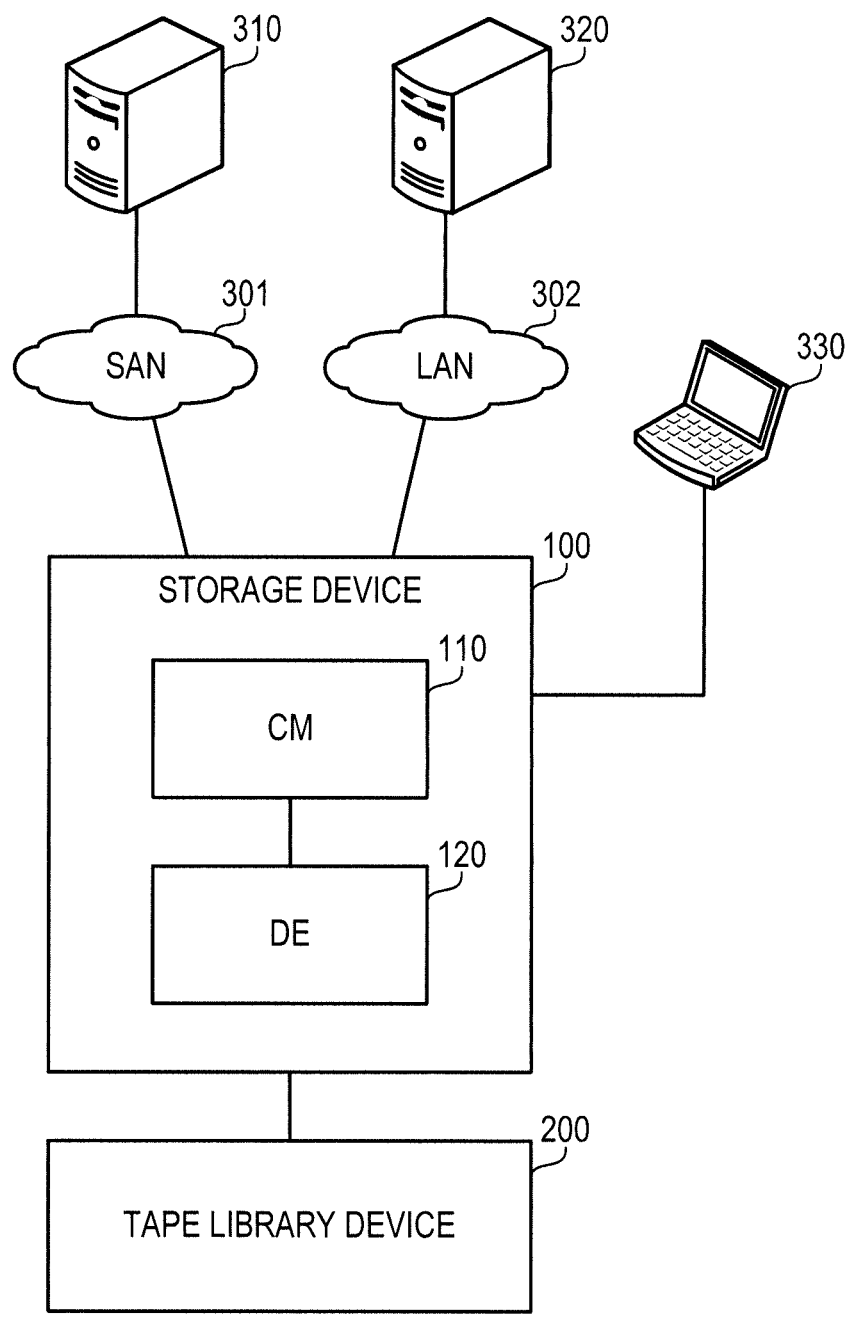
FIG. 2 is a diagram illustrating an exemplary configuration of a storage system according to a second embodiment.

FIG. 2 illustrates an exemplary configuration of a storage system according to the second embodiment. The storage system illustrated in FIG. 2 includes a storage device 100, a tape library device 200, host devices 310 and 320, and a management terminal 330. The storage device 100 includes a controller module (CM) 110 and a drive enclosure (DE) 120.

The DE 120 is a storage unit which is accessed by the host devices 310 and 320. In the DE 120, a plurality of HDDs are mounted as storages that constitute the storage unit. The DE 120 may be provided, for example, outside the storage device 100. Storages that constitute the storage unit is not limited to HDDs, but another type of storages such as, for example, solid state drives (SSDs) may be employed.

The CM 110 is an example of the storage control device 1 illustrated in FIG. 1. The CM 110 is a storage controller that controls an access to the storage unit. That is, the CM 110 controls the access to the HDD within the DE 120 in response to an access request from the host devices 310 and 320.

The tape library device 200 is coupled to the CM 110 within the storage device 100 to communicate with the CM 110 in accordance with a communication protocol such as, for example, serial attached SCSI (SAS) (SCSI: small computer system interface), or fibre channel (FC). In the tape library device 200, one or more tape drives are mounted. The tape drive of the tape library device 200 writes data on a magnetic tape or reads data from the magnetic tape in accordance with an instruction from the CM 110. In the present embodiment, the magnetic tape within the tape library device 200 is used as a backup destination of data.

The host device 310 is coupled to the CM 110 within the storage device 100 via, for example, a storage area network (SAN) 301. The host device 310 requests an access to a logical volume provided from the CM 110 in units of block.

The host device 320 is coupled to the CM 110 within the storage device 100 via, for example, a local area network (LAN) 302. The host device 320 requests an access to a logical volume provided from the CM 110 in units of file.

The management terminal 330 is a terminal device used by an administrator to manage the storage device 100 or the tape library device 200. The management terminal 330 instructs the CM 110 to back up data in a predetermined volume to a magnetic tape within the tape library device 200 in response to, for example, an input operation by the administrator.

Figure 3:
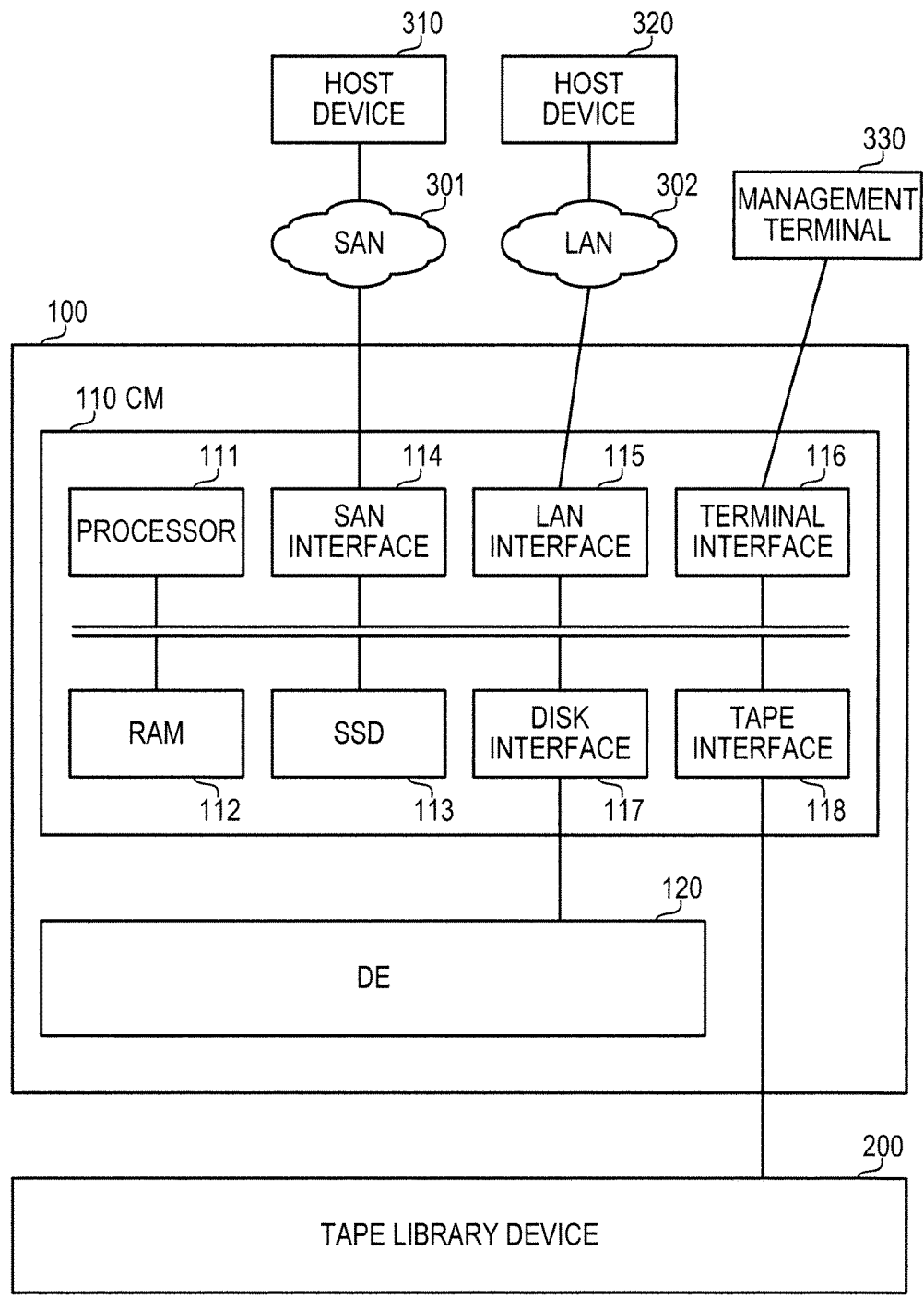
FIG. 3 is a diagram illustrating an exemplary hardware configuration of a CM.

FIG. 3 illustrates an exemplary hardware configuration of the CM. The CM 110 includes a processor 111, a RAM 112, an SSD 113, a SAN interface 114, a LAN interface 115, a terminal interface 116, a disk interface 117, and a tape interface 118. The processor 111 is an example of the controller 1b in FIG. 1, and the RAM 112 or the SSD 113 is an example of the storage 1a in FIG. 1.

The processor 111 performs overall control on processing performed by the CM 110. The processor 111 is, for example, a central processing unit (CPU), a digital signal processor (DSP), an application specific integrated circuit (ASIC), or a field programmable gate array (FPGA). The processor 111 may be a combination of two or more of the CPU, the DSP, the ASIC, the FPGA, and the like.

The RAM 112 is used as a main memory of the CM 110. In the RAM 112, at least a part of an operating system (OS) program or an application program to be executed by the processor 111 is temporarily stored. In the RAM 112, various data used for processing by the processor 111 is temporarily stored.

The SSD 113 is used as an auxiliary storage of the CM 110. The SSD 113 stores therein an OS program, an application program, and various data. The CM 110 may include an HDD instead of the SSD 113 as an auxiliary storage.

The SAN interface 114 is, for example, an interface circuit for communicating with the host device 310 through the SAN 301. The LAN interface 115 is an interface circuit for communicating with the host device 320 through the LAN 302. The terminal interface 116 is an interface circuit for communicating with the management terminal 330.

The disk interface 117 is, for example, an interface circuit for communicating with a storage within the DE 120. The tape interface 118 is, for example, an interface circuit for communicating with a tape drive within the tape library device 200.

Although not illustrated, the host devices 310 and 320 and the management terminal 330 may be implemented as a computer including a processor, a RAM, an HDD, and the like.

Figure 4:
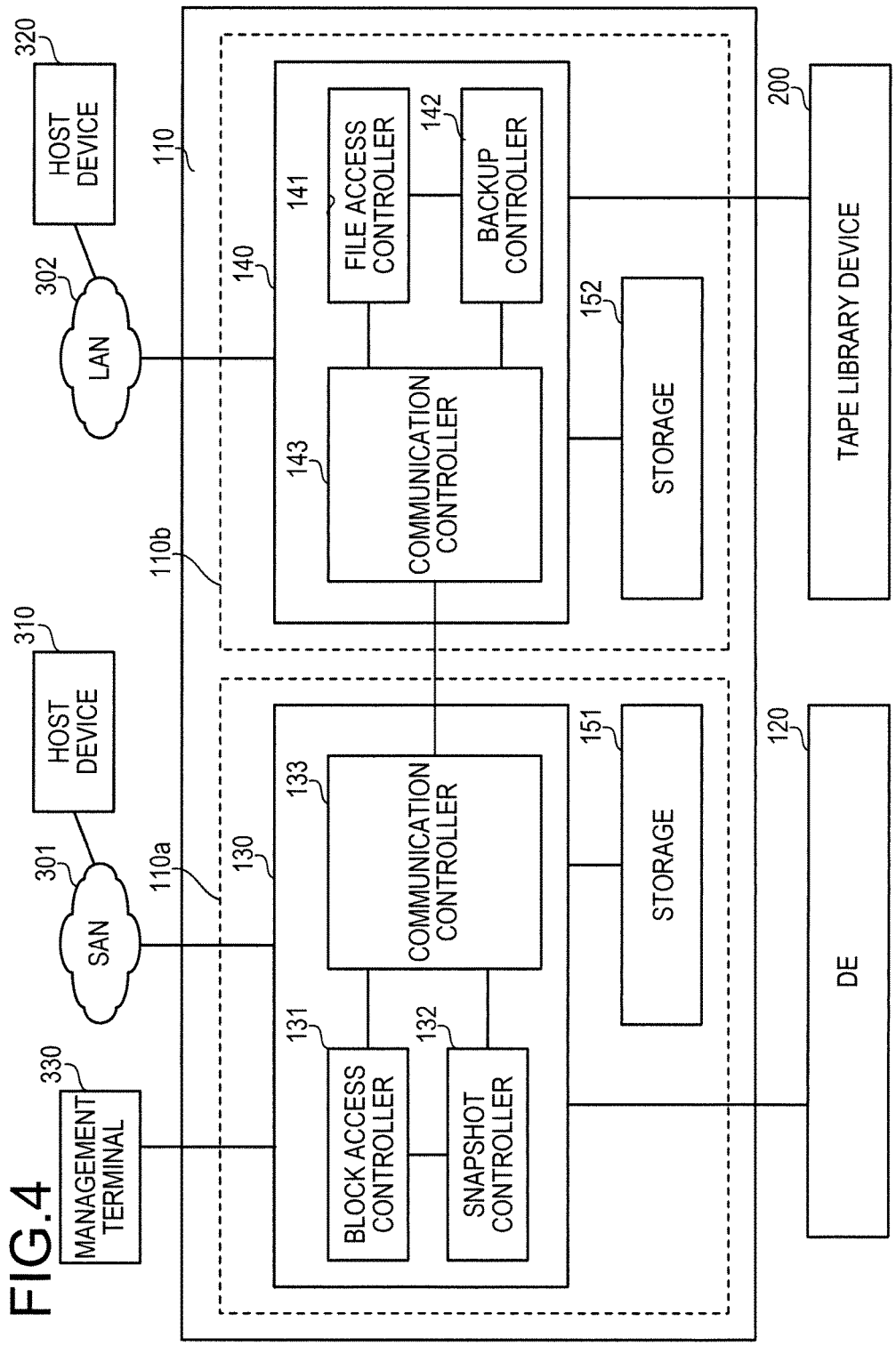
FIG. 4 is a diagram illustrating an exemplary functional configuration of the CM.

FIG. 4 illustrates an exemplary functional configuration of the CM. The CM 110 includes a SAN controller 130, a network attached storage (NAS) controller 140 and storages 151 and 152.

As described above, the host device 310 requests an access to a logical volume provided from the CM 110 in units of block. The host device 320 requests an access to a logical volume provided from the CM 110 in units of file.

The storage device 100 operates as a unified storage complying with two communication protocols having different data access units.

The CM 110 has both a function of performing access control in response to an access request in units of block, and a function of performing access control in response to an access request in units of file (that is, a function of operating as a NAS). The SAN controller 130 corresponds to the function of performing an access control in response to an access request in units of block, and the NAS controller 140 corresponds to the function of performing an access control in response to an access request in units of file.

The SAN controller 130 includes a block access controller 131, a snapshot controller 132, and a communication controller 133.

The block access controller 131 creates logical volumes to be accessed by the host devices 310 and 320. A part of the storage area implemented by the storage within the DE 120 is allocated to the logical volume. The block access controller 131 receives an access request for the logical volume in units of block from the host device 310, and accesses the corresponding storage area within the DE 120 in response to the request. The block access controller 131 may receive an access request for the logical volume from the host device 320 through the NAS controller 140.

In the following description, a logical volume that is accessible from the host device 320 through the NAS controller 140 is referred to as a "NAS volume".

A logical volume for which a snapshot is created is associated with management information (a bit map to be described below) for holding an update location. When writing to the logical volume for which the snapshot is created is requested, the block access controller 131 evacuates data stored in the write destination to a separate storage area, and writes new write data to the logical volume. The block access controller 131 also registers information indicating the location where the writing is performed, in management information.

The snapshot controller 132 creates a snapshot of a logical volume. The snapshot controller 132 controls reading of data from the snapshot. The snapshot controller 132 may transfer management information on the snapshot to the NAS controller 140 in response to a request from the NAS controller 140.

The communication controller 133 controls a communication with the NAS controller 140. The block access controller 131 and the snapshot controller 132 communicate with the NAS controller 140 through the communication controller 133. The communication controlled by the communication controller 133 may include a communication of control information such as management information on a snapshot, an input/output (IO) communication related to writing and reading of a logical volume, and the like.

The NAS controller 140 includes a file access controller 141, a backup controller 142, and a communication controller 143.

The file access controller 141 receives an access request for the NAS volume in units of file from the host device 320. For example, the file access controller 141 may receive, from the host device 320, a request to write or update a file in the NAS volume, and to read a file from the NAS volume.

For example, upon receiving a request for reading a file from the host device 320, the file access controller 141 identifies a storage area, which corresponds to the file, on the NAS volume on the basis of metadata of the file. The file access controller 141 notifies the SAN controller 130 of a logical address of the identified storage area to request to read the file. Upon acquiring actual data of the file from the SAN controller 130, the file access controller 141 transmits the acquired data to the host device 320.

For example, upon receiving a request for writing a file from the host device 320, the file access controller 141 identifies a write area, which corresponds to the file, on the NAS volume. The file access controller 141 notifies the SAN controller 130 of the file and a logical address of the identified write area to request to write the file. Thus, the file is written in a storage area within the DE 120, which corresponds to the write area.

The backup controller 142 backs up data of the NAS volume to a magnetic tape within the tape library device 200. In the backup process, the backup controller 142 instructs the SAN controller 130 to create a snapshot of the NAS volume. The backup controller 142 acquires data of the created snapshot from the SAN controller 130, and writes the acquired data in the magnetic tape. In the backup process at the second and subsequent times, the backup controller 142 executes a differential backup in which only files that are updated since the previous backup time is backed up to the magnetic tape.

The communication controller 143 controls the communication with the SAN controller 130. The file access controller 141 and the backup controller 142 communicate with the SAN controller 130 via the communication controller 143. The communication controlled by the communication controller 143 may include a communication of control information such as management information on a snapshot volume, an JO communication related to writing and reading of a logical volume, and the like.

The storages 151 and 152 are mounted as, for example, storage areas of the RAM 112 or the SSD 113. The storage 151 stores therein various data used for processing performed by the SAN controller 130. For example, the management information on the snapshot volume is stored in the storage 151. The storage 152 stores therein various data used for processing performed by the NAS controller 140. For example, metadata of the file read from the NAS volume is stored in the storage 152.

The processing of the SAN controller 130 and the NAS controller 140 is implemented when, for example, the processor 111 executes a predetermined program. The processing performed by the SAN controller 130 and the processing performed by the NAS controller 140 may be implemented by the same program, or separate programs, respectively.

As illustrated in FIG. 4, virtual machines 110a and 110b may operate on the CM 110 such that the processing performed by the SAN controller 130 is executed by the virtual machine 110a and the processing performed by the NAS controller 140 is executed by the virtual machine 110b. In this case, the processing performed by the SAN controller 130 is implemented by a program executed on the virtual machine 110a, and the processing performed by the NAS controller 140 is implemented by a program executed on the virtual machine 110b. The storage 151 may be mounted in a virtual memory on the virtual machine 110a, and the storage 152 may be mounted in a virtual memory on the virtual machine 110b.

When the processing performed by the SAN controller 130 and the processing performed by the NAS controller 140 are performed by separate programs, the programs may be configured as described below. The processing performed by the snapshot controller 132 and the communication controller 133 is performed in accordance with the same program as the program implementing processing performed by the block access controller 131, or an additional program added to the program. The processing performed by the backup controller 142 and the communication controller 143 is performed in accordance with the same program as the program implementing processing performed by the file access controller 141, or an additional program added to the program.

Hereinafter, a snapshot function will be described.

Figure 5:
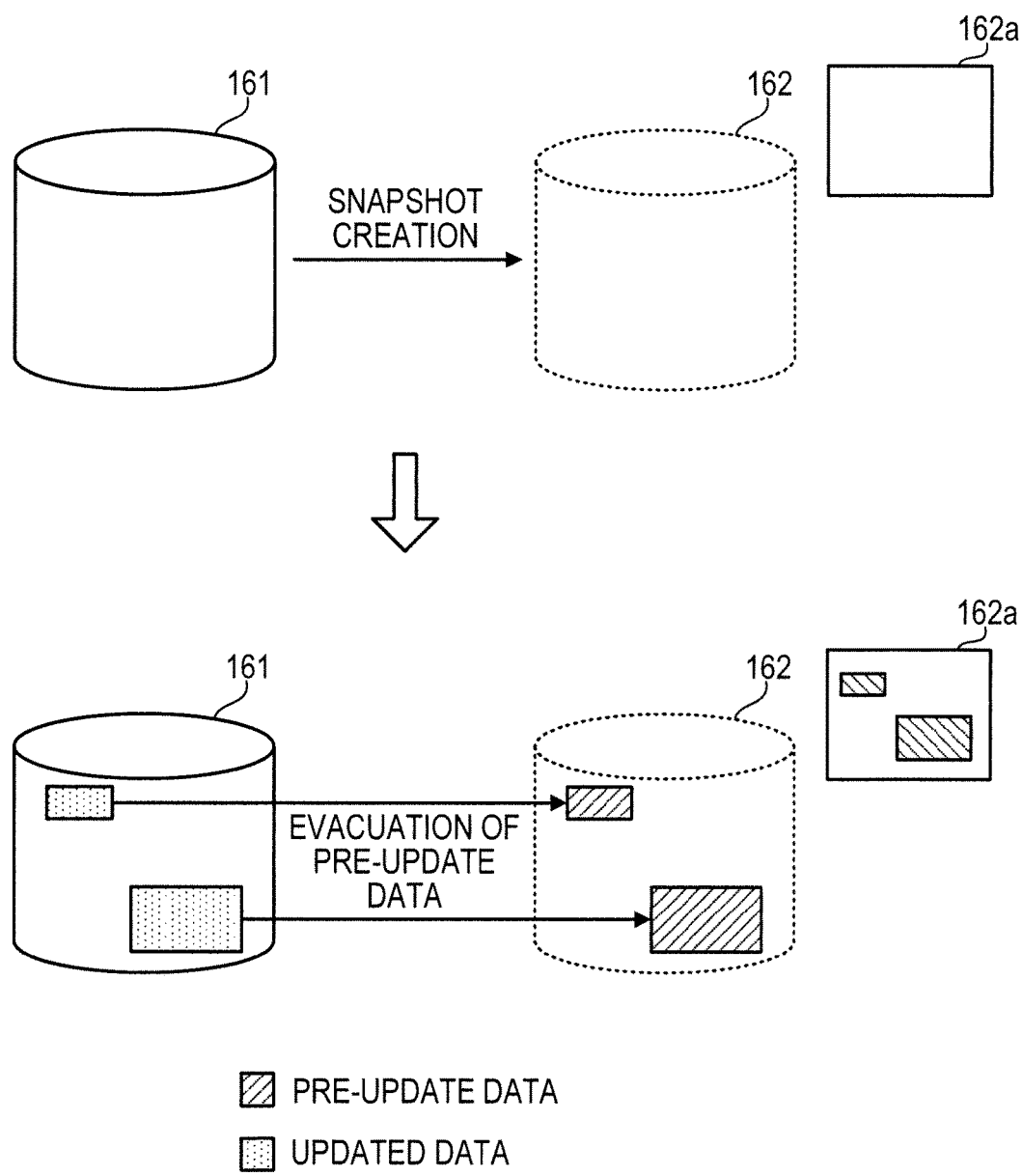
FIG. 5 is a diagram illustrating a snapshot function.

FIG. 5 illustrates a snapshot function. The snapshot function is a function to create a data image of a logical volume at a certain point of time. In the present embodiment, the snapshot is created by a copy-on-write method.

For example, as illustrated in FIG. 5, the snapshot controller 132 creates a snapshot volume 162 as data corresponding to the snapshot of a logical volume 161 in response to a snapshot creation instruction. In the copy-on-write method, actual data of the logical volume 161 is not stored in the snapshot volume 162. Instead, management information such as a pointer to a storage area for the actual data is stored. This shortens the time until a response of creation completion is made after the snapshot creation instruction is received.

Together with the snapshot volume 162, the snapshot controller 132 creates a bit map 162a corresponding to the snapshot volume 162 and stores the bit map 162a in the storage 151. The bit map 162a is management information for managing the location of an updated block in the logical volume 161, and holds a bit value corresponding to each block included in the logical volume 161. The bit value indicates whether data of a corresponding block of the logical volume 161 is updated after the snapshot volume 162 is created. It is assumed that the initial value of the bit value is, for example, "0".

The lower part of FIG. 5 illustrates processing performed by the block access controller 131 in the case where a request to update a block of the logical volume 161 is received after the snapshot volume 162 is created. The block access controller 131 reads a bit value of the bit map 162a, which corresponds to the block.

When the read bit value is "0", the block access controller 131 evacuates pre-update data, which is stored in the block to the snapshot volume 162, and stores new data in the corresponding block on the logical volume 161. The block access controller 131 updates a bit value of the bit map 162a, which corresponds to the block, from "0" to "1".

Evacuation of data to the snapshot volume 162 indicates that a new physical block for storing the data is allocated in the snapshot volume 162. That is, through the data evacuation, a new physical area is allocated to only a block corresponding to a block updated in the original logical volume 161, among blocks of the snapshot volume 162.

The read bit value is "1", the block access controller 131 stores new data in the corresponding block on the logical volume 161 without evacuating pre-update data.

Through the processing using the bit map 162a, the data of the logical volume 161 at a time point when the snapshot volume 162 is created may be reliably left.

Meanwhile, the NAS controller 140 has a function of backing up files stored in the NAS volume, to a magnetic tape.

Figure 6:
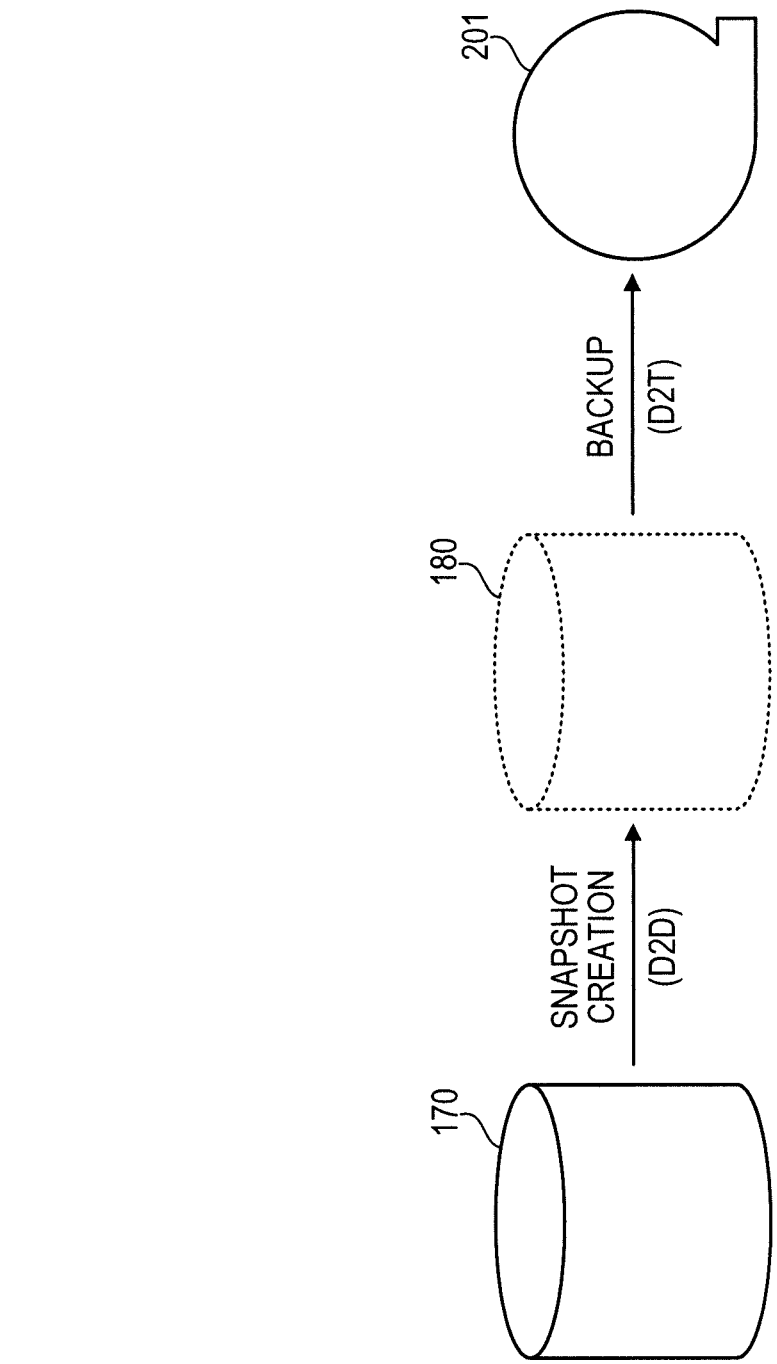
FIG. 6 is a diagram illustrating file backup.

FIG. 6 illustrates file backup. In the present embodiment, in order to reliably back up files within the NAS volume with consistency at a certain point of time, an operation is performed in which a snapshot of the NAS volume is create and the files are backed up from the snapshot to the magnetic tape. Such an operation may be referred to as Disk to Disk to Tape (D2D2T).

In the example of FIG. 6, the backup controller 142 of the NAS controller 140 requests the SAN controller 130 to create a snapshot of a NAS volume 170 at a backup time. Accordingly, a snapshot volume 180 corresponding to the NAS volume 170 is created. This processing corresponds to "D2D" in "D2D2T".

Thereafter, the backup controller 142 backs up the files stored in the snapshot volume 180, to the magnetic tape 201. This processing corresponds to "D2T" in "D2D2T". Since the snapshot volume 180 is created by a copy-on-write method, even when an access to the NAS volume 170 is continued, files stored in the NAS volume 170 at a time point when the backup starts may be reliably backed up.

As described below, in the first backup, all files included in the NAS volume 170 are backed up to the magnetic tape 201 from the corresponding snapshot volume 180. In the backup process at the second and subsequent times, a snapshot volume corresponding to the NAS volume 170 is created each time. Then, the "differential backup" is performed in which only files updated since the previous backup are backed up to the magnetic tape, from the created snapshot volume.

Hereinafter, a file system of the NAS volume 170 will be described.

Figure 7:
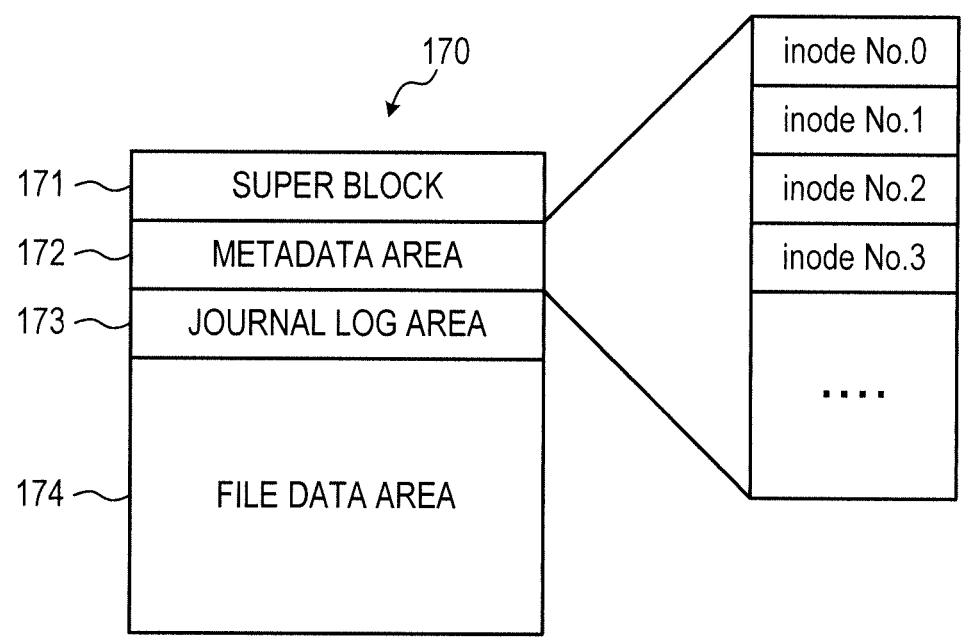
FIG. 7 is a diagram illustrating an exemplary layout of data included in a file system.

FIG. 7 illustrates an exemplary layout of data included in the file system. The NAS volume 170 includes a super block 171, a metadata area 172, a journal log area 173, and a file data area 174.

The super block 171 includes information on the file system such as, the type of the file system, the date and time of creation/update of the file system, the size and layout of the file system, and the like.

The metadata area 172 includes metadata on files or directories. The metadata on a file may include an inode that is created for each file. The inode is management data in which information on an object in the file system, such as a file or a directory is recorded. In the inode created for each file, a file type, a file size, a file update date and time, a pointer to a logical location of file data on the NAS volume 170 and the like are described. The inode may include an archive attribute that is set to ON when the file is updated, and is set to OFF when the file is backed up. The metadata area 172 also includes an inode in which information on a directory is described.

The journal log area 173 includes information used for restoring the file system, such as file update information.

File data is stored in the file data area 174.

In the present embodiment, it is assumed that the file system of the NAS volume 170 has the following characteristics. Each of the areas illustrated in FIG. 7 is fixedly allocated to the NAS volume 170, and each area may be identified by designating a logical block address (LBA) on the NAS volume 170. The array number of an inode may be identified on the basis of the logical address of the inode.

In order to perform differential backup in units of file, the backup controller 142 needs to identify files updated since the previous backup among files included in the snapshot volume. As a method of determining whether a file is updated, there is a method of checking the metadata corresponding to the file. For example, the backup controller 142 may refer to an inode corresponding to the file, and determine that the file is updated when the update date and time of the file is newer than the previous backup time, or when the archive attribute is set to ON.

However, there is a problem in that, in order to identify updated files, the backup controller 142 needs to check inodes corresponding to all files written in the metadata area 172, and the processing load is large. As the number of files increases, the number of inodes to be checked also increases, and the load of the processor 111 increases. This increases processing time required for the checking.

Figure 8:
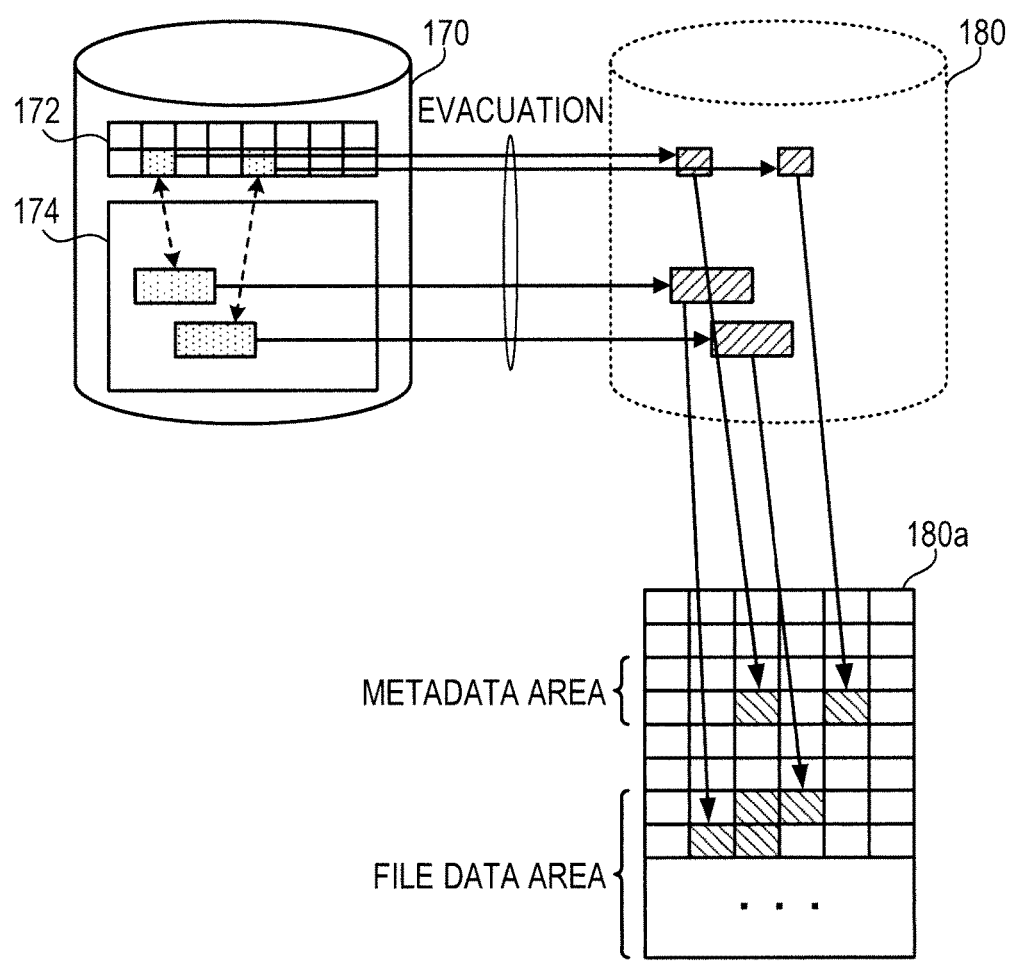
FIG. 8 is a diagram illustrating an exemplary process of updating a NAS volume after snapshot creation.

Here, FIG. 8 is illustrates an exemplary process of updating the NAS volume after the snapshot is created. When a file within the NAS volume 170 is updated after the snapshot volume 180 is created, not only a pre-update file, but also a pre-update inode corresponding to the file is evacuated to the snapshot volume 180.

In the example of FIG. 8, update of two files stored in the file data area 174 of the NAS volume 170 is requested. In this case, not only the areas of files within the file data area 174, but also the areas of inodes in the metadata area 172, which corresponds to the files, is updated. This is because at least update time information among information pieces of an inode is updated. Thus, pre-update files and pre-update inodes corresponding to the files are evacuated to the snapshot volume 180. Then, after the evacuation is completed, a new file is written in the file data area 174, and a corresponding inode in the metadata area 172 is updated.

Through such file update, in a bit map 180a corresponding to the snapshot volume 180, a bit corresponding to each of the areas of the evacuated files in the file data area and areas of the evacuated inodes in the metadata area is set to "1". As a result, in the bit map 180a, not only the locations of the areas of the files on the NAS volume 170, which are updated after the snapshot volume 180, are registered, but also the locations of the inode areas corresponding to the updated files are registered.

Then, at the next backup time, a snapshot volume corresponding to the NAS volume 170 is newly created. At this time, in the bit map 180a, the locations of the areas of the files on the NAS volume 170, which are updated until the present time from the previous backup time, and the locations of the inode areas corresponding to the updated files are registered.

That is, when the next generation snapshot volume is created, the bit map corresponding to the previous generation snapshot volume holds information indicating areas of inodes in the metadata area, which corresponds to the updated files. Therefore, in the present embodiment, the backup controller 142 identifies the areas of the inodes in the metadata area, which corresponds to the updated file, based on the bit map corresponding to the previous generation snapshot volume. Then, the backup controller 142 identifies the updated files by referring to only the inodes included in the identified areas. Accordingly, the number of inodes to be referenced to identify the updated files may be reduced, and the processing load for the identification may be reduced.

FIG. 9 illustrates a specific example of data arrangement in the NAS volume. For example, on the NAS volume, a super block, a metadata area, and a journal log area are allocated as illustrated in an area correspondence table 175 of FIG. 9. Each of the areas is associated with bit numbers of the bit map as illustrated in the area correspondence table 175. Here, it is assumed that the size of a logical area managed by one bit of the bit map is 16 kilobytes. The area correspondence table 175 may be stored in, for example, the storage 152, and referred to by the backup controller 142 so as to recognize the relationship between the bit of the bit map and each of the areas.

Figure 10:
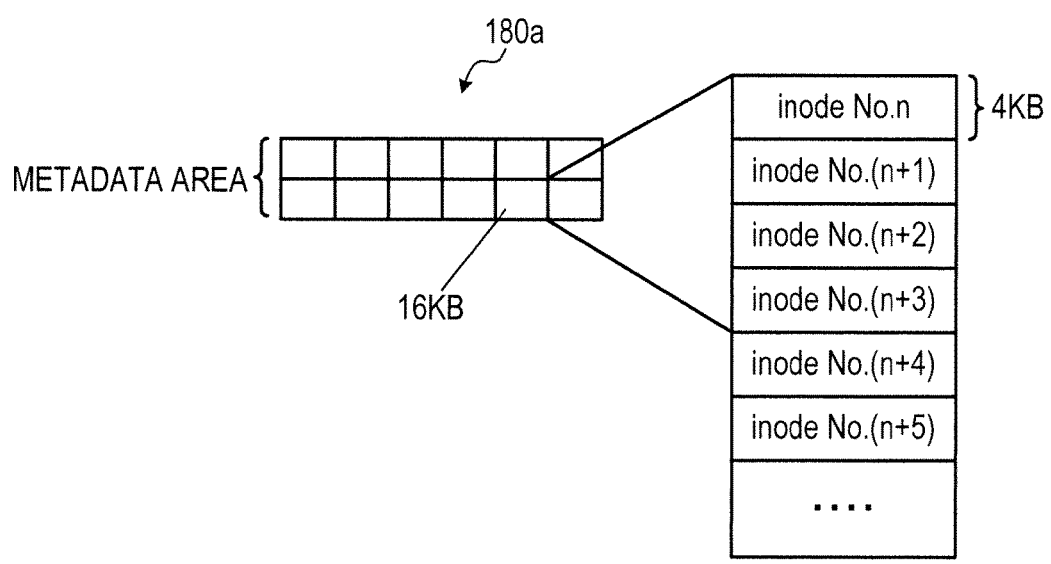
FIG. 10 is a diagram illustrating a relationship between a bit of a bit map and an inode.

FIG. 10 illustrates a relationship between a bit of a bit map and an inode. As illustrated in FIG. 10, in the present embodiment, it is assumed that the size of the inode corresponding to each file is 4 kilobytes. Meanwhile, as described above, the size of the logical area managed by one bit of the bit map 180a is 16 kilobytes. In this case, four inodes are included in the logical area managed by each bit of the bit map 180a corresponding to the metadata area.

Figure 11:
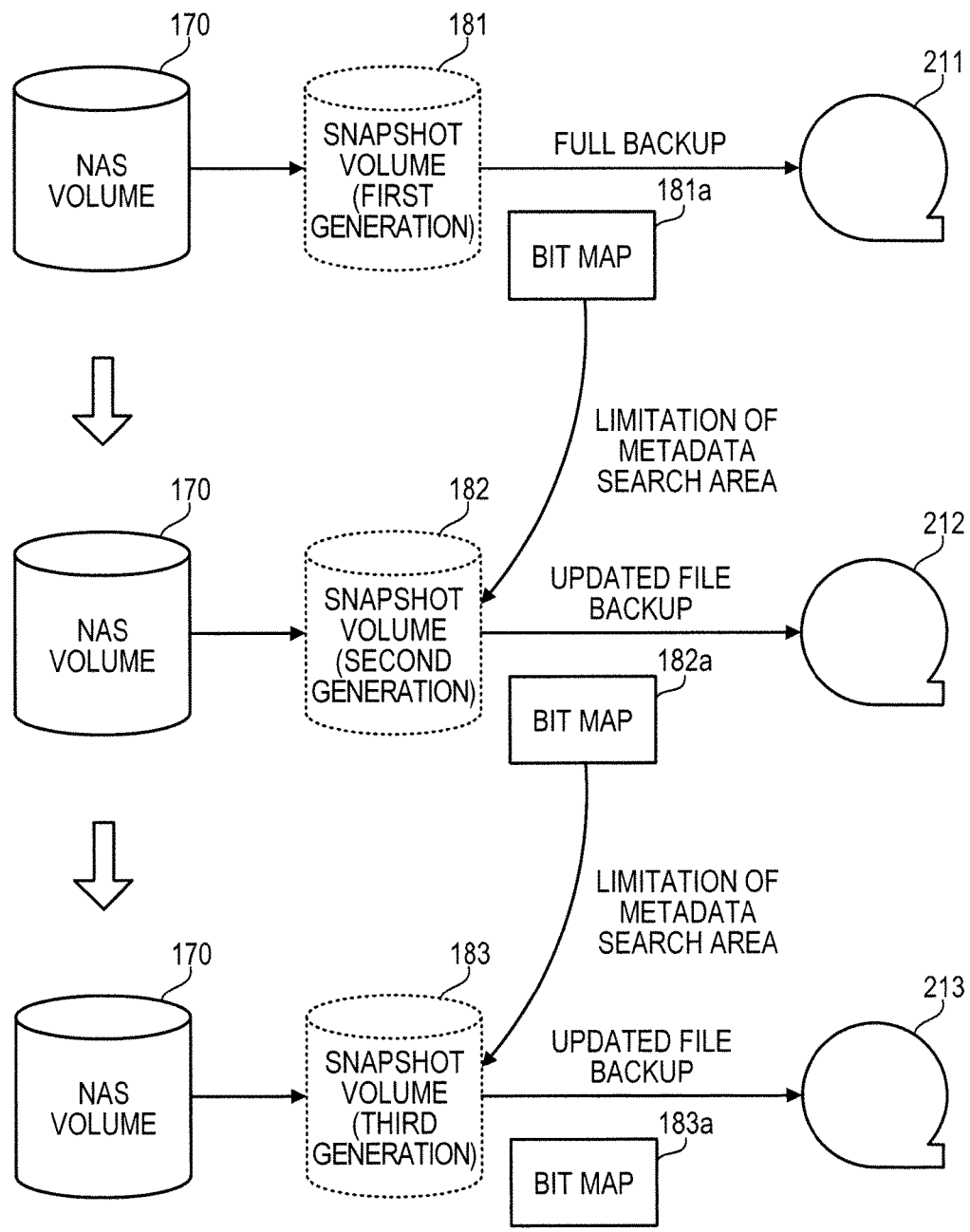
FIG. 11 is a diagram illustrating an exemplary file backup process in a second embodiment.

FIG. 11 illustrates an exemplary file backup process in the second embodiment. At the first backup timing, the backup controller 142 requests the SAN controller 130 to create a snapshot. Accordingly, a first generation snapshot volume 181 and a bit map 181a corresponding to the NAS volume 170 are created. The backup controller 142 backs up all files included in the snapshot volume 181 to the magnetic tape 211 (full backup).

After the snapshot volume 181 is created, an access to the NAS volume 170 from the host device 320 is continued, and an update location in the NAS volume 170 is recorded in the bit map 181a. At the next backup timing, the backup controller 142 requests the SAN controller 130 to create a snapshot. Accordingly, a second generation snapshot volume 182 and a bit map 182a corresponding to the NAS volume 170 are created.

The backup controller 142 refers to the bit map 181a to identify bits, for which "1" is set, among the bits corresponding to the metadata area of the snapshot volume 182. The backup controller 142 reads data in the logical areas corresponding to the identified bits to acquire inodes. Thus, an area of the metadata searched to identify updated files is limited, the processing load for the search is reduced, and the processing time is reduced.

In the logical area corresponding to each identified bit, at least one updated inode is included. The backup controller 142 extracts the updated inodes, and backs up files corresponding to the extracted inodes to the magnetic tape 212. Accordingly, only files in NAS volume 170, which are updated since the previous backup time, are backed up to the magnetic tape 212. The backup destination may be the same magnetic tape 211 as that at the previous time.

After the snapshot volume 182 is created, an access to the NAS volume 170 from the host device 320 is continued, and update locations in the NAS volume 170 are recorded in the bit map 182a. Then, at the next backup timing, the backup controller 142 requests the SAN controller 130 to create a snapshot. Accordingly, a third generation snapshot volume 183 and a bit map 183a corresponding to the NAS volume 170 are created.

The backup controller 142 may limit a metadata area searched to identify updated files on the basis of the bit map 182a by the same procedure as the second backup. Then, the backup controller 142 identifies updated files on the basis of inodes in the searched metadata area, and backs up only the updated files to the magnetic tape 213. The backup destination may be any one of the magnetic tapes 211 and 212.

In the snapshot technology, when a previous generation snapshot volume is deleted, a bit map corresponding to the snapshot volume may be merged into a bit map corresponding to a next generation snapshot volume. However, in the present embodiment, it is necessary to hold a bit map corresponding to a snapshot volume at the generation before the current generation by one generation, and a bit map corresponding to a snapshot volume at the generation before the current generation by two generations. This is to make it possible to identify files updated since the previous backup at each backup timing. In the example of FIG. 11, when backup is made from the third generation snapshot volume 183, the bit map 182a corresponding to the second generation snapshot volume 182 and the bit map 181a corresponding to the first generation snapshot volume 181 need to be held.

In other words, when a snapshot volume of a certain generation is created, a bit map corresponding to a snapshot volume at the generation before the current generation by two generations may be merged into a bit map corresponding to a snapshot volume at a further preceding generation. However, a bit map corresponding to a snapshot volume at the generation before the current generation by one generation is not merged into a bit map corresponding to a snapshot volume at a further preceding generation.

The backup controller 142 may back up the files updated since the first backup, at the backup process at the second and subsequent times. In this case, a bit map corresponding to a snapshot volume at the generation before the current generation by two generations may be merged into a bit map corresponding to a further preceding snapshot volume.

Hereinafter, the procedure of a backup process will be described with reference to sequence diagrams and a flowchart.

Figure 12:
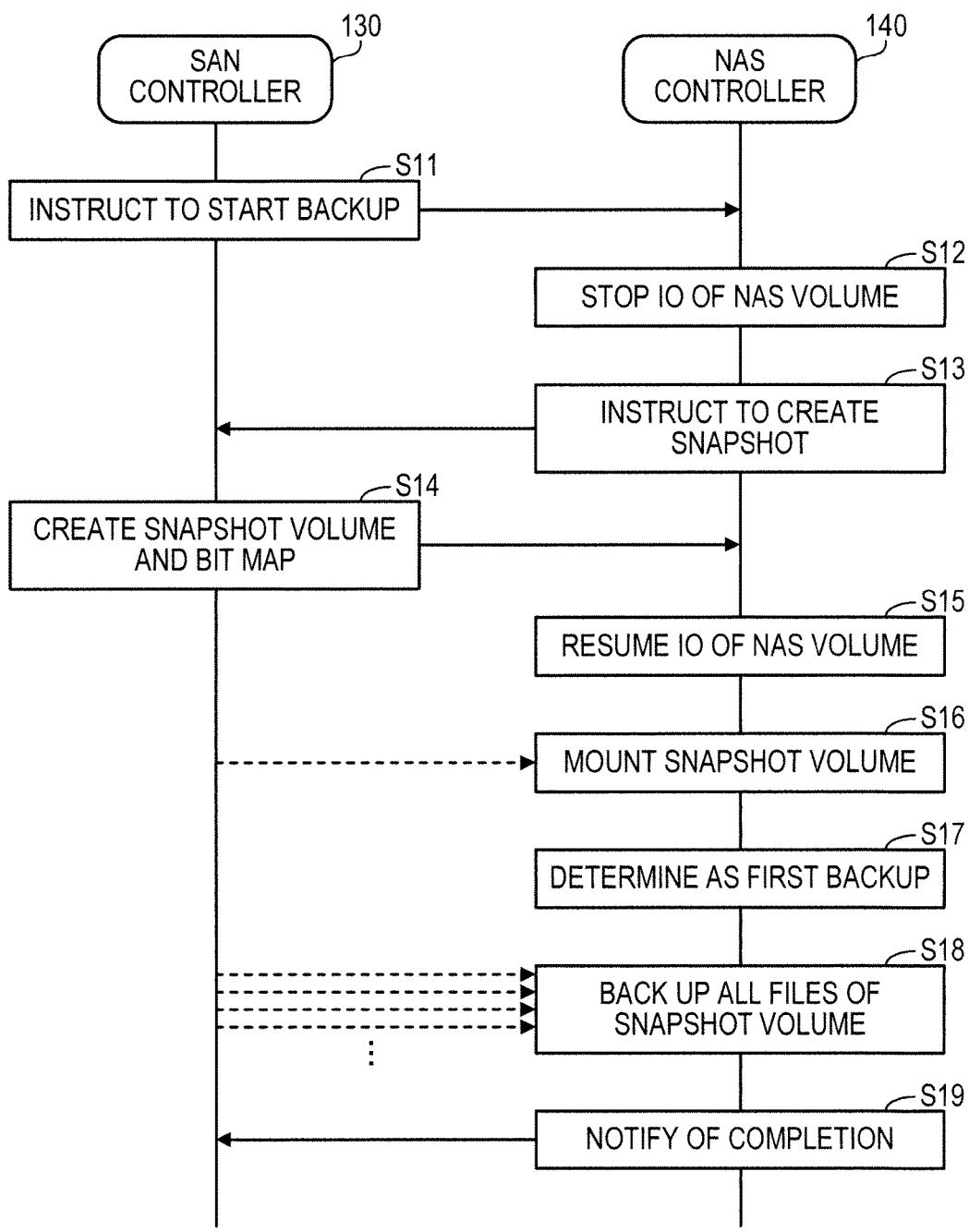
FIG. 12 is a sequence diagram illustrating an exemplary procedure of a backup process at the first time.

FIG. 12 is a sequence diagram illustrating an exemplary procedure of a backup process at the first time.

(S11) The snapshot controller 132 of the SAN controller 130 receives an instruction to start backup of a NAS volume from the management terminal 330. The snapshot controller 132 instructs the NAS controller 140 to start backup of the NAS volume via the communication controller 133.

The instruction to start the backup may be directly received by the NAS controller 140 from the management terminal 330.

(S12) The backup controller 142 of the NAS controller 140 causes the file access controller 141 to temporarily stop IO processing on the NAS volume in response to a request from the host device 320.

(S13) The backup controller 142 instructs the SAN controller 130 to create a snapshot of the NAS volume, through the communication controller 143.

(S14) The snapshot controller 132 of the SAN controller 130 creates a snapshot volume corresponding to the NAS volume and a bit map used for managing update locations. The bit map is stored in the storage 151. Upon completing the creation of the snapshot volume and the bit map, the snapshot controller 132 notifies the NAS controller 140 of the creation completion through the communication controller 133.

(S15) The backup controller 142 of the NAS controller 140 causes the file access controller 141 to resume IO processing on the NAS volume in response to a request from the host device 320.

(S16) The backup controller 142 mounts the snapshot volume created in S14. In this processing, for example, identification information used for identifying the created snapshot volume is acquired from the snapshot controller 132 of the SAN controller 130.

(S17) The backup controller 142 determines how many times NAS volume backup is performed. Here, the backup controller 142 determines that the backup is the first backup, and performs the processing in S18.

(S18) The backup controller 142 backs up all files included in the NAS volume to the magnetic tape. In this processing, the backup controller 142 requests the snapshot controller 132 of the SAN controller 130 to read data from a file data area of the snapshot volume. The backup controller 142 stores all files included in the data read in response to the request, in the magnetic tape.

(S19) Upon completing the backup of all files, the backup controller 142 notifies the SAN controller 130 of the backup completion through the communication controller 143.

Although not illustrated, the snapshot controller 132 of the SAN controller 130 notifies the management terminal 330 of the backup completion.

Figure 13:
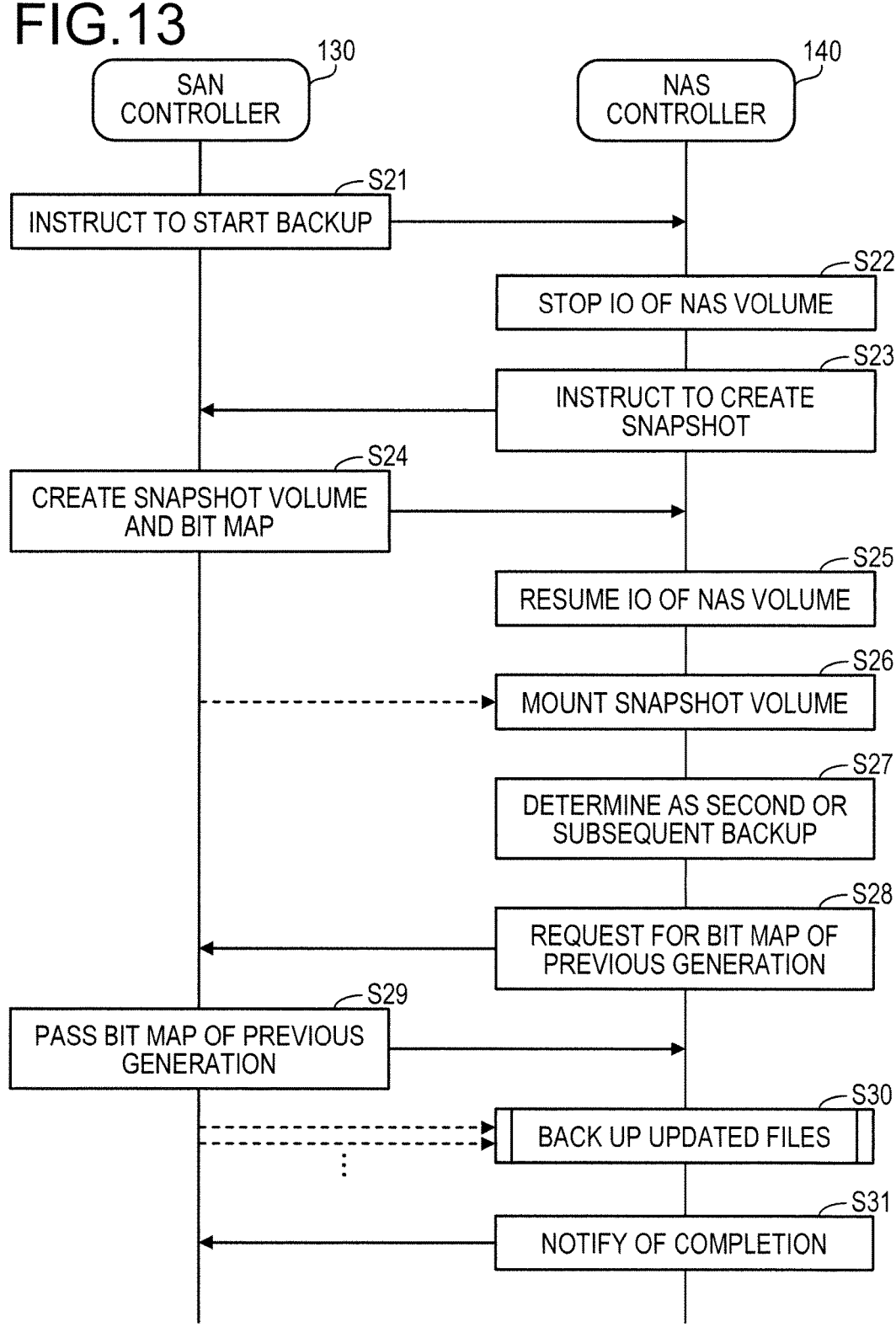
FIG. 13 is a sequence diagram illustrating an exemplary procedure of a backup process at the second and subsequent times.

FIG. 13 is a sequence diagram illustrating an exemplary procedure of a backup process at the second and subsequent times.

In S21 to S26, the same processing as those in S11 to S16 of FIG. 12, respectively, are performed. That is, the snapshot controller 132 of the SAN controller 130 instructs the NAS controller 140 to start backup of the NAS volume in response to an instruction from the management terminal 330 (S21). The backup controller 142 of the NAS controller 140 causes the file access controller 141 to temporarily stop IO processing on the NAS volume in response to a request from the host device 320 (S22). Then, the backup controller 142 instructs the SAN controller 130 to create a snapshot of the NAS volume (S23).

The snapshot controller 132 of the SAN controller 130 creates a snapshot volume corresponding to the NAS volume and a bit map used for managing update locations (S24). Upon he snapshot controller 132 completing the creation of the snapshot volume and the bit map, the backup controller 142 of the NAS controller 140 causes the file access controller 141 to resume IO processing on the NAS volume in response to a request from the host device 320 (S25). Then, the backup controller 142 mounts the snapshot volume created in S24 (S26).

(S27) The backup controller 142 determines how many times NAS volume backup is performed. Here, the backup controller 142 determines that the backup is the second or subsequent backup, and performs the processing in S28.

(S28) The backup controller 142 requests the SAN controller 130 for a bit map corresponding to a previous generation snapshot volume, through the communication controller 143.

(S29) The snapshot controller 132 of the SAN controller 130 passes the bit map corresponding to the previous generation snapshot volume to the NAS controller 140 through the communication controller 133. The backup controller 142 of the NAS controller 140 acquires the bit map.

(S30) The backup controller 142 backs up files updated since the creation of the previous generation snapshot, among files included in the snapshot volume, to a magnetic tape on the basis of the bit map acquired in S29. This processing will be described in detail with reference to FIG. 14.

(S31) Upon completing the backup of all updated files, the backup controller 142 notifies the SAN controller 130 of the backup completion through the communication controller 143. Although not illustrated, the snapshot controller 132 of the SAN controller 130 notifies the management terminal 330 of the backup completion.

In the present embodiment, it is assumed that updated files are identified based on the update dates and times described in inodes. However, for example, when the updated files are identified based on archive attributes described in the inodes, the following processing is performed in FIGS. 12 and 13. In S14 of FIG. 12 and in S24 of FIG. 13, the snapshot controller 132 creates the snapshot volume, and then clears OFF the archive attributes of inodes corresponding to all files within the original NAS volume. Here, on the created bit map, the update of the archive attributes is not reflected.

Figure 14:
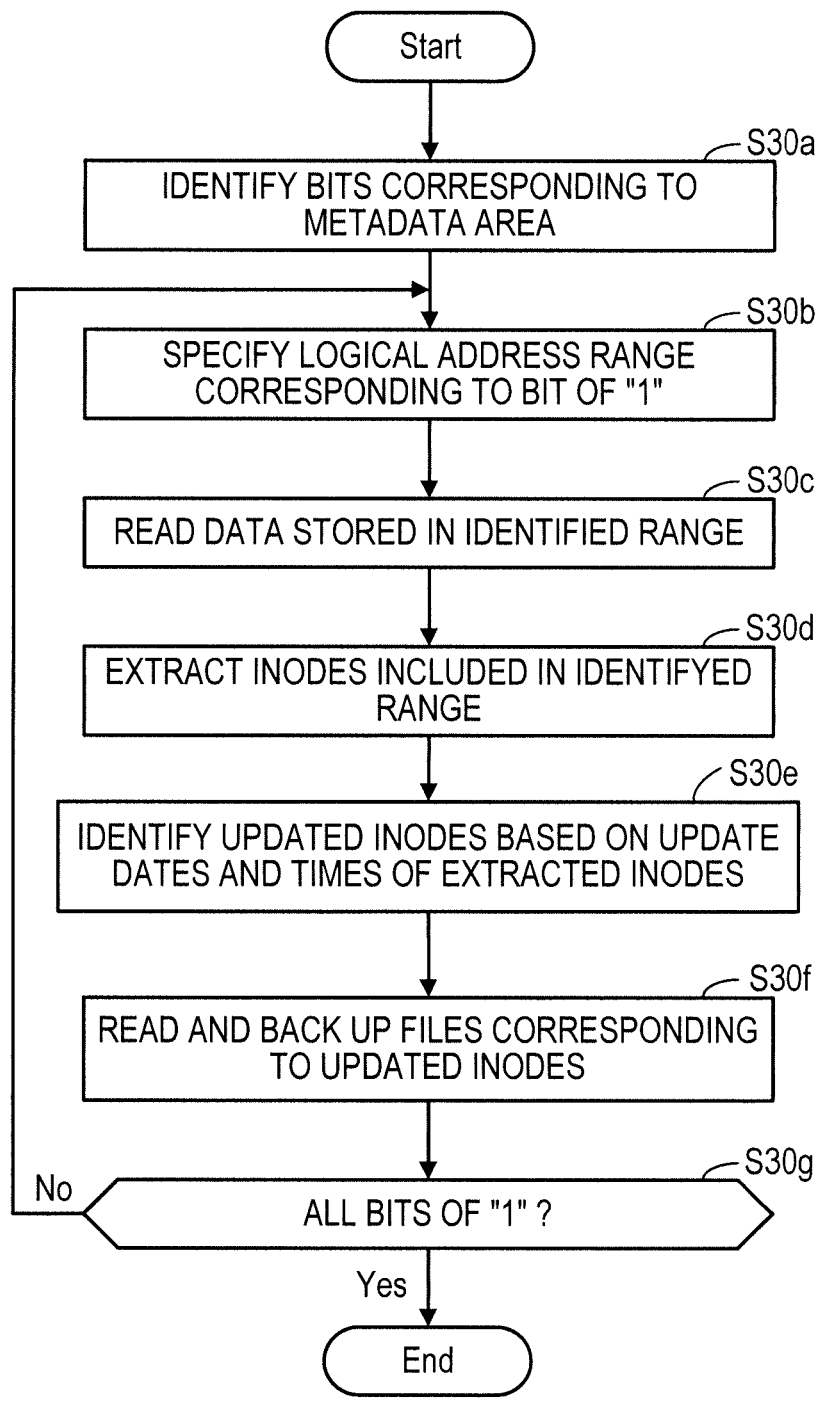
FIG. 14 is a flowchart illustrating an exemplary procedure of a process of backing up updated files.

FIG. 14 is a flowchart illustrating an exemplary procedure of a process of backing up the updated files. The process in FIG. 14 corresponds to S30 of FIG. 13.

(S30a) The backup controller 142 of the NAS controller 140 identifies bits corresponding to a metadata area from the bit map acquired in S29 of FIG. 13.

(S30b) The backup controller 142 selects one bit for which "1" is set among the bits identified in S30a as processing target. The backup controller 142 identifies the range of logical addresses on the snapshot volume corresponding to the selected bit.

(S30c) The backup controller 142 requests the SAN controller 130 to read data from the logical address range identified in S30b through the communication controller 143. The snapshot controller 132 of the SAN controller 130 reads data in the specified range from the snapshot volume, and passes the read data to the NAS controller 140 via the communication controller 133.

(S30d) The backup controller 142 of the NAS controller 140 identifies the numbers of inodes included in the logical address range identified in S30b, based on the logical addresses. Then, the backup controller 142 extracts inodes having the identified numbers from the data read in S30c. In the present embodiment, four inodes are extracted through this processing.

(S30e) The backup controller 142 identifies updated inodes, based on the update date and time of each of the inodes extracted in S30d. Specifically, when the update date and time described in the inode is newer than the date and time at which the previous generation snapshot is created, the backup controller 142 determines that the inode is updated. In S30e, among the four extracted inodes, at least one is identified as an updated inode.

When an archive attribute is used instead of the update date and time, the inode is determined to be updated when the archive attribute described in the inode is ON.

(S30f) The backup controller 142 acquires a range of logical addresses in which the corresponding file is stored, from the updated inode. The backup controller 142 requests the SAN controller 130 to read data from the acquired range of the logical addresses, through the communication controller 143. The snapshot controller 132 of the SAN controller 130 reads data stored in the specified range from the snapshot volume, and passes the read data to the NAS controller 140 through the communication controller 133. Accordingly, the backup controller 142 of the NAS controller 140 acquires the updated files. The backup controller 142 stores the acquired files in the magnetic tape.

(S30g) The backup controller 142 determines whether the processing in S30b to S30f is performed on all bits set with "1" among bits corresponding to the metadata area of the bit map. When there is a bit that is not yet processed, the backup controller 142 returns to S30b, selects one unprocessed bit, and continues to perform the processing. When processing is completed on all bits, the backup controller 142 performs the processing in S31 of FIG. 13.

In the processing of S30c in FIG. 14, data is read only from the area corresponding to the bit set with "1" in the metadata area of the snapshot volume. Then, in S30e, the inodes included in the read data are referenced. Accordingly, the number of inodes to be read from the metadata area of the snapshot volume and to be referenced to identify the updated files is reduced. Accordingly, the processing load of the differential backup may be reduced and the processing time thereof may be shortened.

The functions of the devices (e.g., the storage control device 1 and the CM 110) described in the embodiments described above may be implemented by a computer. In this case, a program, in which the processing contents of functions that each device needs to have is described, is provided and executed by the computer so that the functions are implemented on the computer. The program may be recorded in a computer-readable recording medium. As the computer-readable recording medium, a magnetic storage device, an optical disk, a magneto-optical recording medium, a semiconductor memory, and the like may be exemplified. As the magnetic storage device, a hard disk device (HDD), a flexible disk (FD), a magnetic tape, and the like may be exemplified. As the optical disk, a digital versatile disc (DVD), a DVD-RAM, a compact disc read-only memory (CD-ROM), a CD-Recordable/ReWritable (R/RW), and the like may exemplified. As the magneto-optical recording medium, a magneto-optical disk (MO) and the like may be exemplified.

When the program is commercially distributed, for example, a portable recording medium such as a DVD or a CD-ROM, in which the program is recorded, may be sold. The program may be stored in a storage device of a server computer, and then may be transmitted to another computer from the server computer via a network.

The computer that executes the program stores the program, which is, for example, recorded in the portable recording medium or transmitted from the server computer, in its own storage device. Then, the computer reads the program from the storage device and executes the program to perform a process in accordance with the program. The computer may directly read a program from the portable recording medium, and perform the process in accordance with the program. Also, the computer may sequentially execute a process in accordance with a received program each time the program is transmitted from the server computer coupled via a network.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to an illustrating of the superiority and inferiority of the invention. Although the embodiments of the present invention have been described in detail, it should be understood that the various changes, substitutions, and alterations could be made hereto without departing from the spirit and scope of the invention.

What is claimed is:

1. A storage control device, comprising:
    a memory; and
    a processor coupled to the memory and the processor configured to:
        create a first snapshot corresponding to a storage area of a first storage device by a copy-on-write method;
        create management information and store the management information in the memory, the management information being used for managing a location of each of a plurality of data blocks updated after the creation of the first snapshot and including a plurality of bit values corresponding to the plurality of data blocks, respectively, the plurality of data blocks being included in the storage area of the first storage device and each of the plurality of data blocks storing at least part of a file;
        copy all of first files included in the first snapshot to a first backup area of a second storage device;
        create a second snapshot corresponding to the storage area of the first storage device;
        identify, based on the management information, a second area in a first area of the second snapshot, the first area storing therein first metadata on all of second files included in the second snapshot, the second area being updated after the creation of the first snapshot;
        identify updated files updated after the creation of the first snapshot among the second files, based on second metadata among the first metadata, the second metadata being included in the second area
        allocate at least one data block for each of at least one update target file in the first snapshot by evacuating each of the at least one update target file according to a bit value corresponding to each of the at least one data block of the first storage device that stores each of the at least one update target file; write a file to the at least one data block of the first storage device that stores each of the at least one update target file to update the at least one update target file; and
        copy the updated files to a second backup area of the second storage device.

2. The storage control device according to claim 1, wherein
    the first metadata includes management data for each of the second files, the management data including at least one of update time information and an archive attribute for a relevant file, the update time information indicating date and time at which the relevant file is updated, the archive attribute indicating whether a backup of the relevant file is completed, and
    the processor is configured to identify the updated files based on the management data included in the second metadata.

3. The storage control device according to claim 1, wherein the processor is configured to:
    perform, in accordance with a first program, a first control process of accessing the storage area in response to a request to access the storage area of the first storage device in units of block;
    perform, in accordance with a second program, a second control process of accessing the storage area of the first storage device in response to a request to access the storage area of the first storage device in units of file;
    perform the creation of the first snapshot and the second snapshot and the storage of the management information in accordance with the first program or a program added to the first program; and
    perform the copy to the first backup area of the second storage device and the copy to the second backup area of the second storage or a third storage device in accordance with the second program or a program added to the second program.

4. The storage control device according to claim 1, wherein the processor is configured to:
    operate a first virtual machine that accesses the storage area of the first storage device in response to a request to access the storage area of the first storage device in units of block;
    operate a second virtual machine that accesses the storage area of the first storage device in response to a request to access the storage area of the first storage device in units of file;
    cause the first virtual machine to perform the creation of the first snapshot and the second snapshot and the storage of the management information; and
    cause the second virtual machine to perform the copy to the first backup area and the copy to the second backup area.

5. A storage system, comprising:
a first storage device;
a second storage device; and
a storage control device coupled to the first storage device and the second storage device, the storage control device including:
   a memory; and
   a processor coupled to the memory and the processor configured to:
      create a first snapshot corresponding to a storage area of the first storage device by a copy-on-write method;
      create management information and store the management information in the memory, the management information being used for managing a location of each of a plurality of data blocks updated after the creation of the first snapshot and including a plurality of bit values corresponding to the plurality of data blocks, respectively, the plurality of data blocks being included in the storage area of the first storage device and each of the plurality of data blocks storing at least part of a file;
      copy all of first files included in the first snapshot to a first backup area of the second storage device;
      create a second snapshot corresponding to the storage area of the first storage device;
      identify, based on the management information, a second area in a first area of the second snapshot, the first area storing therein first metadata on all of second files included in the second snapshot, the second area being updated after the creation of the first snapshot;
      identify updated files updated after the creation of the first snapshot among the second files, based on second metadata among the first metadata, the second metadata being included in the second area allocate at least one data block for each of at least one update target file in the first snapshot by evacuating each of the at least one update target file according to a bit value corresponding to each of the at least one data block of the first storage device that stores each of the at least one update target file; write a file to the at least one data block of the first storage device that stores each of the at least one update target file to update the at least one update target file; and
      copy the updated files to a second backup area of the second storage device.

6. A non-transitory computer-readable recording medium having stored therein a program that causes a computer to execute a process, the process comprising:
   creating a first snapshot corresponding to a storage area of a first storage device by a copy-on-write method;
   creating management information and storing the management information in a memory included in the computer, the management information being used for managing a location of each of a plurality of data blocks updated after the creation of the first snapshot and including a plurality of bit values corresponding to the plurality of data blocks, respectively, the plurality of data blocks being included in the storage area of the first storage device and each of the plurality of data blocks storing at least part of a file;
   copying all of first files included in the first snapshot to a first backup area of a second storage device;
   creating a second snapshot corresponding to the storage area of the first storage device;
   identifying, based on the management information, a second area in a first area of the second snapshot, the first area storing therein first metadata on all of second files included in the second snapshot, the second area being updated after the creation of the first snapshot;
   identifying updated files updated after the creation of the first snapshot among the second files, based on second metadata among the first metadata, the second metadata being included in the second area; allocating at least one data block for each of at least one update target file in the first snapshot by evacuating each of the at least one update target file according to a bit value corresponding to each of the at least one data block of the first storage device that stores each of the at least one update target file; writing a file to the at least one data block of the first storage device that stores each of the at least one update target file to update the at least one update target file; the second area; and
   copying the updated files to a second backup area of the second storage device.

7. The storage system according to claim 5,
wherein each of the plurality of data blocks stores at least part of a file, and
wherein the processor is configured to:
   allocate at least one data block for each of at least one update target file in the first snapshot by evacuating each of the at least one update target file according to a bit value corresponding to each of the at least one data block of the first storage device that stores each of the at least one update target file; and
   write a file to the at least one data block of the first storage device that stores each of the at least one update target file to update the at least one update target file.

8. The storage control device according to claim 1,
wherein the at least one update target file is evacuated to the first snapshot when the bit value corresponding to each of the at least one data block of the first storage device that stores the at least one update target file is "0," and
wherein the bit value is updated from "0" to "1" after the at least one update target file is updated.

9. The storage system according to claim 7,
wherein the at least one update target file is evacuated to the first snapshot when the bit value corresponding to each of the at least one data block of the first storage device that stores the at least one update target file is "0," and
wherein the bit value is updated from "0" to "1" after the at least one update target file is updated.

10. The non-transitory computer-readable recording medium according to claim 9,
wherein the at least one update target file is evacuated to the first snapshot when the bit value corresponding to each of the at least one data block of the first storage device that stores the at least one update target file is "0," and
wherein the bit value is updated from "0" to "1" after the at least one update target file is updated.

* * * * *